July 7, 1925.

O. W. COMSTOCK

DOUGH SPACER

Filed Dec. 19, 1924 2 Sheets-Sheet 1

1,545,400

WITNESSES
Edw. Thorpe
A. L. Kitchin

INVENTOR
O. W. Comstock
BY
ATTORNEYS

July 7, 1925. 1,545,400
O. W. COMSTOCK.
DOUGH SPACER
Filed Dec. 19, 1924 2 Sheets-Sheet 2
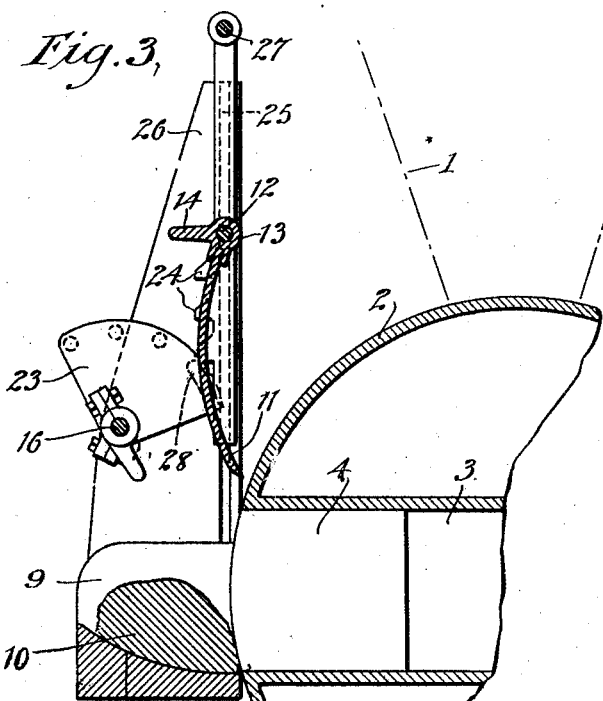
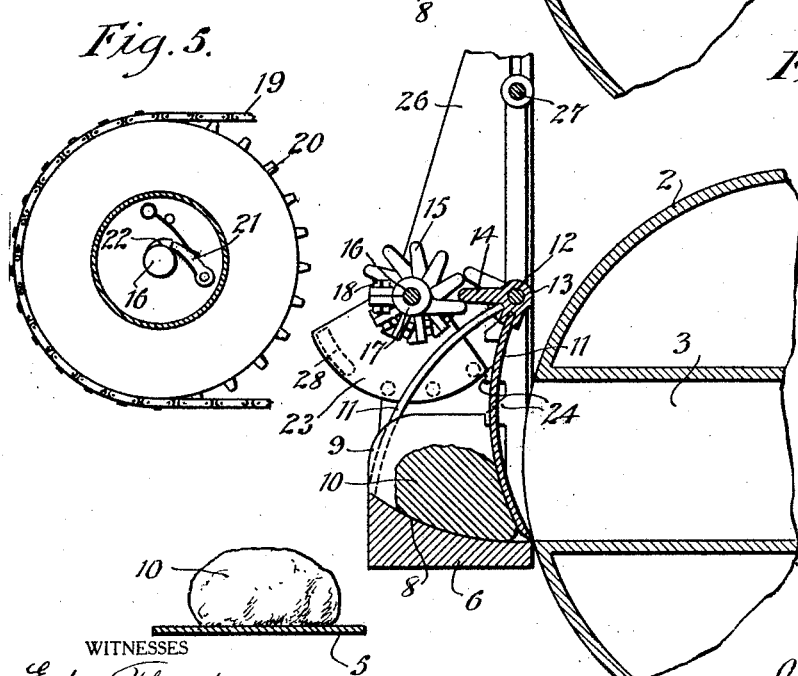
WITNESSES
Edw. Thorpe
A. L. Kitchin
INVENTOR
O. W. Comstock
BY Munn & Co
ATTORNEYS Patented July 7, 1925.

1,545,400

UNITED STATES PATENT OFFICE.

OLIVER W. COMSTOCK, OF VALLEY STREAM, NEW YORK.

DOUGH SPACER.

Application filed December 19, 1924. Serial No. 756,976.

*To all whom it may concern:*

Be it known that I, OLIVER W. COMSTOCK, a citizen of the United States, and a resident of Valley Stream, in the county of Nassau and State of New York, have invented a new and Improved Dough Spacer, of which the following is a full, clear, and exact description.

This invention relates to machinery used in bakeries and particularly to an improved construction known as a dough spacer adapted to receive the dough as it comes from the divider and deposit the same at spaced intervals on the traveling belt.

The object of the invention is to provide an improved construction wherein the dough may be readily received and discharged at spaced intervals and may be received at the next operation at timed intervals thereby eliminating what is known as "doubles."

Another object of the invention is to provide a spacer wherein the dough is fed into the spacer almost continuously and is discharged therefrom at spaced intervals in such a manner as to be deposited a predetermined distance apart on adjacent traveling belt.

A further object of the invention is to provide a dough spacer for depositing at spaced intervals dough on a traveling belt, the spacer being such that it is connected up and timed with the dough supplying machinery associated therewith.

In the accompanying drawings—

Figure 3 is a sectional view through Figure 1 on line 3—3.

Figure 4 is a sectional view through Figure 2 on line 4—4.

Figure 5 is a fragmentary sectional view through Figure 1 on line 5—5.

Referring to the accompanying drawings by numerals, 1 indicates a hopper adapted to contain dough in a certain stage of preparation. The hopper 1 is adapted to feed to the cylinder 2 batches or small quantities of dough from time to time as the cylinder 2 is provided with a central passage-way 3 in which a plunger 4 is positioned. Suitable mechanism, not shown, is adapted to move the cylinder 2 so that the passage-way 3 will be in line with the hopper 1. When this occurs the plunger 4 will be retracted a certain distance and dough will be removed by gravity or be forced into the passage-way 3 until the same is filled from the plunger to the periphery. The cylinder then turns until the passage-way 3 is in a horizontal position as shown in Figure 3 and the plunger 4 is caused to function for forcing the dough from the passage-way 3. The structure just described is old and well known, and therefore, has not been shown in detail.

Figure 1:
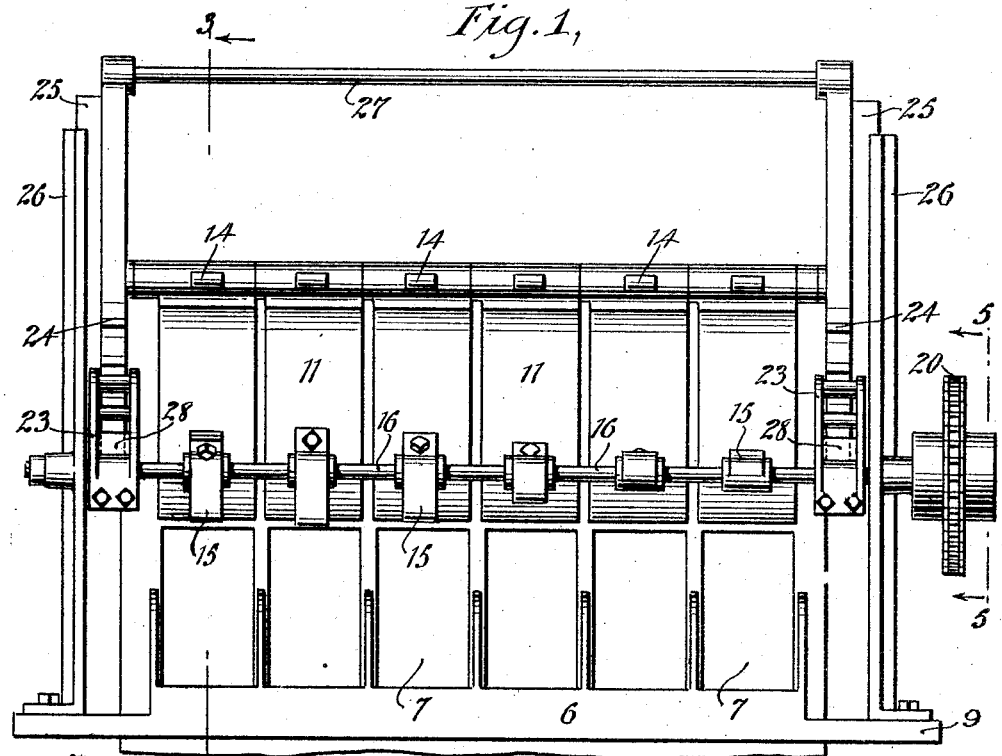
Figure 1 is a front view of a dough spacer disclosing an embodiment of the invention, the same being shown in a raised position.
Figure 2:
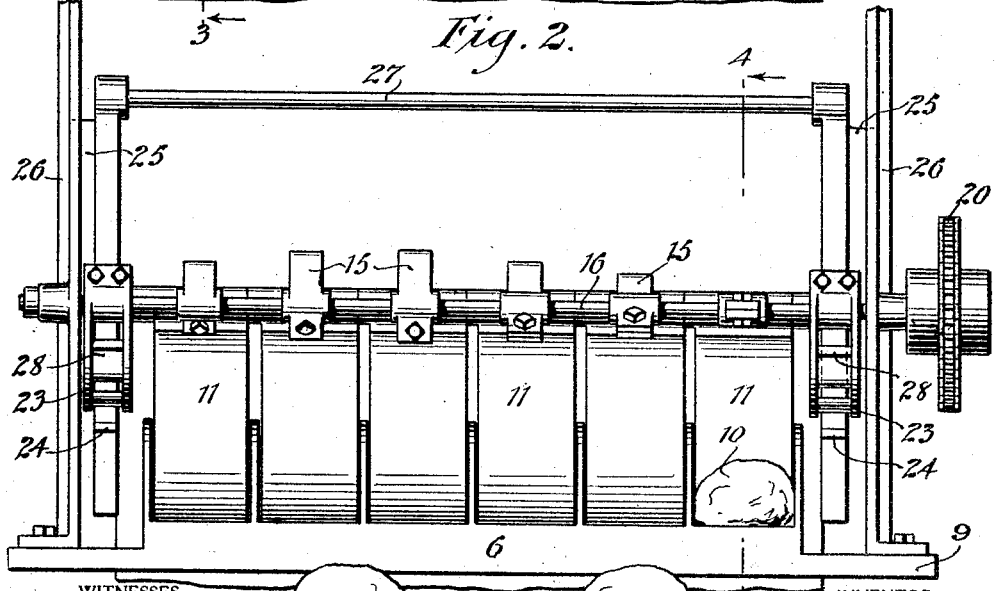
Figure 2 is a view similar to Figure 1 but showing the parts in a lowered position with a quantity of dough ready to be moved.

The invention consists in an improved structure for receiving the dough from the passage-way 3 and discharging the same onto a belt 5 which travels at a certain speed in front of the spacer structure 6. It will be understood that there are a large number of the passage-ways 3 in the cylinder 2, there being six in the cylinder 2 as illustrated in the drawing so that small quantities of dough may be forced through the various openings 7 in the spacer 6. As the cylinder 2 rotates the batches of dough are forced through the opening 7 onto the inclined platform 8, which platform is divided by a number of division walls 9 so that the various batches or small quantities 10 will be maintained separate. As soon as the dough has been discharged, the various ejecting blades 11 are forced downwardly from the position shown in Figure 3 or allowed to move downwardly under the action of gravity until the parts assume the position shown in Figure 4. When this occurs, the cylinder 2 begins a further movement so as to receive another supply of dough which will be discharged a little later onto the inclined platform 8. It will be noted that each of the ejecting blades 11 is sharpened at the lower edge and scrapes across the cylinder adjacent the various passage-ways 3 so that they will clean these edges to a certain extent and at the same time readily pass back of the batches 10. Each of the blades 11 is loosely mounted on the shaft 12. Preferably a sleeve 13 surrounds shaft 12 for each of the blades 11. Each of the sleeves 13 is provided with a lug or projection 14 acting in a certain sense as a cam and co-acting with one of the cams or arms 15 rigidly secured to the shaft 16. Preferably all of the arms 15 are arranged in line when the blades are in the same relative position, as for instance, in the position shown in Figure 3. The arms 15, however, are set at different angles around the shaft 16 so that the arm 15 nearest the left end of the structure shown in Figure 1 will first raise cam 14 and thereby cause its blade 11 to function. The second arm 15 from the left in Figure 1 will then function and so on until the arm 15 on the right will function. After this takes place, all the parts move up to the position shown in Figure 1 and then the action is repeated. It will be noted that each of the arms 15 is provided with an encircling collar 17 provided with ears through which bolts 18 pass whereby the collars may be readily adjusted to vary the position of the arms 15 as may be desired. When the parts have assumed the position shown in Figures 1 and 3, the various plungers 4 force the various batches 10 simultaneously onto the curved surface 8 and then the cylinder and associated parts move back to be refilled while the blades 11 drop down to the position shown in Figure 4. The blades 11 are then operated in succession for successively forcing the various batches or quantities of dough 10 onto the belt 5. After the last batch or quantity 10 has been forced onto the belt 5, the parts again assume the position shown in Figure 3 and the action is repeated as long as the machine is in operation. In order to move the shaft 16 and cause the parts to assume the position shown in Figures 1 and 3, power is secured from any suitable source, as for instance, the machine of which drum 2 is a part, said power being transmitted through the chain 19 whereby the blades 11 and other parts forming the spacer will be operated in time relationship with the drum 2 and associated parts. The chain 19 operates the sprocket wheel 20 which is connected to the shaft 16 through a suitable clutch, the same being shown in Figure 5 and illustrated as a spring pressed pawl 21 co-acting with a stop or cam 22. By this construction and arrangement, if the cylinder 2 or other parts of the machine is rotated in a reverse direction, the spacer device will not be operated. However, when the parts are operating in the correct direction, shaft 16 will rotate and in rotating will move the respective members 23 secured to the shaft 16 near each end, said members acting as segmental gears meshing on each revolution with the respective racks 24, said racks being connected to the guiding fins 25 and said guiding fins in turn being guided in suitable guiding grooves in the standards or uprights 26, which standards or uprights are rigidly secured in any desired manner with the platform or base 8. A bracing rod 27 is connected to the upper end of the racks 24 while the rod 12 is connected to the racks about midway of their length so that the various blades 11 may be swingably mounted thereon. It will, therefore, be noted that as the sprocket wheel 20 is rotated, the racks 24 will be raised and will thereby raise the blades 11 and associated parts but will automatically release the same as the respective segmental gears 23 move away from the racks. This will allow the blades 11 and associated parts to drop down under the action of gravity to substantially the position shown in Figure 4, after which, the blades are actuated by the various arms 15. During the actuation of the arms 15, the gears 23 are moving and at the correct time will again engage the racks 24 to raise the racks and associated parts. Preferably, the speed of the device is such that the batches 16 of dough will be quickly pushed from the platform 8 but will not be flung therefrom. As there is an appreciable interval between the pushing of the batches 10 from the platform 8, there will be an automatic spacing of the batch of dough on the traveling carrier 5 so that the batches of dough may be discharged at proper intervals into the other dough working machines which form no part of the present invention. In order that the blades 11 may be maintained in the elevated position shown in Figure 3 for a predetermined length of time after having been raised to that position, an elongated tooth 28 is provided on the gear 23. The outer surface of tooth 28 is struck on an arc from the center of rod 16 whereby tooth 28 will slide under the lowermost tooth of rack 24 and maintain the rack and associated parts in elevated position for the desired time. It is understood that the pins or teeth of gear 23 may be of any desired number, but for the construction shown, it has been found that three bevel pins or teeth are preferable and the elongated tooth or pin 28 for maintaining the rack and associated parts stationary in their elevated position a predetermined length of time. By holding the parts in an elevated position in this manner, the last piece of dough forced onto the belt 5 is allowed to move a desired distance before a new batch of dough is placed on the belt. Also, this holding of the parts in the elevated position permits ample time for the plunger 4 to function.

What I claim is:

1. A dough spacer, comprising a platform divided into sections, said sections being adapted to receive different batches of dough, a swinging blade arranged to engage said platform along one edge, a shaft swingably supporting all of said blades, a vertical reciprocating frame carrying said shaft and a rotatable driving shaft, means operated by said driving shaft for successively swinging said blades when they are adjacent said platform whereby said dough will be successively moved off of the platform, and means operated by said driving shaft for raising said frame and all of said blades simultaneously away from said platform.

2. A dough spacer, comprising a dough receiving platform, guiding uprights carried by said platform, a vertical reciprocating frame guided by said uprights, a shaft connecting said frame, a plurality of ejecting blades swingably mounted on said shaft, each of said blades having an ejecting cam, means for raising said frame and parts carried thereby at the time the dough is deposited on said platform, and a plurality of rotatable arms co-acting with said cams for moving the same and the blades for swinging the blades when adjacent said platform whereby the batches of dough mounted thereon will be discharged, said arms functioning to cause said blades to swing in succession.

3. In a dough spacer of the character described, a plurality of ejecting members, a rod swingably supporting said ejecting members, a pair of racks connected to said rod, means acting as segmental gears co-acting with said racks for raising the racks and then releasing the same whereby said blades will be raised at spaced intervals and then allowed to drop back to their first position, and means for actuating said segmental gears.

OLIVER W. COMSTOCK.